(12) United States Patent
Yoon et al.

(10) Patent No.: US 9,966,624 B2
(45) Date of Patent: May 8, 2018

(54) MANUFACTURING METHOD OF SINTERED BODY FOR ELECTROLYTE AND ELECTROLYTE FOR FUEL CELL USING THE SAME

(71) Applicant: KOREA INSTITUTE OF SCIENCE AND TECHNOLOGY, Seoul (KR)

(72) Inventors: Kyung Joong Yoon, Seoul (KR); Seung-Hwan Lee, Seoul (KR); Mansoo Park, Seoul (KR); Jongsup Hong, Seoul (KR); Hyoungchul Kim, Seoul (KR); Ji-Won Son, Seoul (KR); Jong Ho Lee, Seoul (KR); Byung Kook Kim, Seoul (KR); Hae-Weon Lee, Seoul (KR)

(73) Assignee: KOREA INSTITUTE OF SCIENCE AND TECHNOLOGY, Seoul (KR)

( * ) Notice: Subject to any disclaimer, the term of this patent is extended or adjusted under 35 U.S.C. 154(b) by 0 days. days.

(21) Appl. No.: 15/346,105

(22) Filed: Nov. 8, 2016

(65) Prior Publication Data
US 2018/0026292 A1    Jan. 25, 2018

(30) Foreign Application Priority Data
Jul. 20, 2016    (KR) .................. 10-2016-0092193

(51) Int. Cl.
*H01M 8/12*    (2016.01)
*H01M 8/1253*    (2016.01)
(Continued)

(52) U.S. Cl.
CPC ......... *H01M 8/1253* (2013.01); *H01M 8/126* (2013.01); *H01M 2008/1293* (2013.01); *H01M 2300/0077* (2013.01)

(58) Field of Classification Search
CPC ....... H01M 8/1253; H01M 2008/1293; H01M 2300/0077; H01M 8/126
See application file for complete search history.

(56) References Cited

U.S. PATENT DOCUMENTS

2015/0255821 A1*    9/2015    Lim .................... H01M 8/1253
                                                                                    429/496

FOREIGN PATENT DOCUMENTS

JP    2008-071668 A    3/2008
JP    2010-510635 A    4/2010
(Continued)

*Primary Examiner* — Stewart A Fraser
(74) *Attorney, Agent, or Firm* — Goldilocks Zone IP Law

(57) ABSTRACT

Provided is a method for manufacturing a sintered body for an electrolyte and an electrolyte for a fuel cell using the same. More particularly, the following disclosure relates to a method for preparing an electrolyte having a firm thin film layer by using a sintered body having controlled sintering characteristics, and application of the electrolyte to a solid oxide fuel cell. It is possible to control the sintering characteristics of a sintered body through a simple method, such as controlling the amounts of crude particles and nanoparticles. In addition, an electrode using the obtained sintered body having controlled sintering characteristics is effective for forming a firm thin film layer. Further, such an electrolyte having a firm thin film layer formed thereon inhibits combustion of fuel with oxygen when it is applied to a fuel cell, and thus shows significantly effective for improving the quality of a cell.

12 Claims, 6 Drawing Sheets

(51) Int. Cl.
*H01M 8/126* (2016.01)
*H01M 8/124* (2016.01)

(56) References Cited

FOREIGN PATENT DOCUMENTS

| KR | 10-0590556 B1 | 6/2006 |
| KR | 10-2009-0002895 A | 1/2009 |
| KR | 10-2011-0051955 A | 5/2011 |

* cited by examiner

MANUFACTURING METHOD OF SINTERED BODY FOR ELECTROLYTE AND ELECTROLYTE FOR FUEL CELL USING THE SAME

CROSS-REFERENCE TO RELATED APPLICATIONS

This application claims priority under 35 U.S.C. § 119 to Korean Patent Application No. 10-2016-0092193 filed on Jul. 20, 2016 in the Korean Intellectual Property Office, the disclosure of which is incorporated herein by reference in its entirety.

TECHNICAL FIELD

The following disclosure relates to a method for manufacturing a sintered body for an electrolyte and an electrolyte for a fuel cell using the same. More particularly, the following disclosure relates to preparation of an electrolyte having a firm thin film layer using a sintered body having controlled sintering characteristics, and application of the electrolyte to a solid oxide fuel cell.

BACKGROUND

In general, an anode-supported solid oxide fuel cell (SOFC) has a ceramic multilayer structure including an electrolyte having a thickness of several tens of micrometers, a reaction-preventing layer and a cathode, stacked successively on an anode support having a thickness of about 1 mm.

To form a dense and firm electrolyte thin film layer in such a ceramic multilayer structure, it is essentially required to control the sintering characteristics of raw material powder and optimize them. If not, a difference in sintering shrinkage behaviors between an anode and an electrolyte, results in bending of a cell upon simultaneous sintering, which may cause various types of processing defects or failure of a cell. In addition, when a thin film layer is formed by post-sintering, it is not possible to increase the density of a film sufficiently at a low degree of sintering. On the contrary, when a degree of sintering is excessively high, a film excessively shrinks before an interfacial binding with a substrate is formed, resulting in interfacial defects such as delamination. Therefore, when an electrolyte thin film is manufactured through post-sintering, it is very important to control the sintering characteristics of an electrolyte in order to densify the thin film layer, while inhibiting generation of processing defects.

Commercially available electrolyte powder includes yttria-stabilized zirconia, scandia-stabilized zirconia, gadolinia-doped ceria and samaria-doped ceria. Such powder has its unique defined specification. Thus, it is very difficult to control the sintering characteristics to meet a particular use by using such powder.

Therefore, conventional methods for controlling a degree of sintering of a sintered body, such as ceramic, include controlling a powder size or adding a sintering aid. It is possible to increase a degree of sintering using nanoparticles having a large specific surface area. However, it is very difficult to synthesize particles while controlling the particle size gradually from a nanometer scale to a micrometer scale. Thus, it is practically impossible to obtain sintering characteristics required for a particular situation precisely by controlling the particle size itself. In addition, it is possible to use a method of mixing crude particles with fine particles to control a degree of sintering gradually. However, fine nano-scaled powder has strong cohesive force, and thus it is difficult for such nano-scaled powder to be dispersed completely among crude particles. When such nanopowder forms agglomerate, it cannot provide a function of improving a degree of sintering. Moreover, a portion where nanopowder is agglomerated shows a relatively lower sintering rate as compared to the other portions. Therefore, processing defects caused by a local difference in sintering characteristics may occur with ease.

Another method for improving the sintering characteristics of the sintered body is adding a sintering aid. However, such a method has a problem in that it is not possible to form a dense film uniformly due to a local difference in sintering rate. In general, the sintering aid is added in the form of an oxide or nitrate. When the sintering aid is not distributed uniformly, a portion where a large amount of sintering aid is present shows a high densification rate, while the other portion causes a processing defect, such as pores in the vertical direction.

Under these circumstances, it is required to provide a method for distributing nanopowder and a sintering aid very uniformly and to inhibit agglomeration in order to obtain a film having a desired structure by controlling sintering behaviors and inhibiting generation of processing defects by using the effects of the nanopowder and sintering aid.

REFERENCES

Patent Document (Patent Document 1) Korean Patent Publication No. 10-0590556

SUMMARY

An embodiment of the present disclosure is directed to providing a sintering body having controlled sintering characteristics through a simple process.

Another embodiment of the present disclosure is directed to providing an electrolyte having a firm thin film layer by using the sintered body having controlled sintering characteristics and applying the electrolyte to a solid oxide fuel cell.

In one aspect, there is provided a method for manufacturing a sintered body for an electrolyte, which includes: (i) mixing a solution containing preliminarily formed crude particles dispersed therein with a nanoparticle precursor solution for preparing nanoparticles; (ii) a combustion step wherein nanoparticles are prepared on the surface of the crude particles from the resultant mixture; and (iii) a calcination step wherein impurities are removed from the combustion product, wherein the crude particle is at least one selected from cerium oxides including at least one selected from the group consisting of gadolinium (Gd), samarium (Sm) and lanthanum (La), and zirconium oxides including at least one selected from the group consisting of yttrium (Y), scandium (Sc) and calcium (Ca); and the nanoparticles are prepared in the form of nanoparticles attached to the surface of the crude particles through a combustion process using at least one selected from cerium nitrate, gadolinium nitrate, samarium nitrate, lanthanum nitrate, zirconium nitrate, yttrium nitrate, scandium nitrate and calcium nitrate as a precursor.

According to an embodiment, step (ii) may be carried out at a temperature of 100-500° C.

According to another embodiment, step (iii) may be carried out by performing calcination at a temperature of 400-1000° C., and then performing a ball milling process.

According to still another embodiment, cerium oxide may be gadolinia-doped ceria (GDC), samaria-doped ceria (SDC), lanthanum-doped ceria (LDC) or a mixture thereof.

According to still another embodiment, zirconium oxide may be yttria-stabilized zirconia (YSZ), scandia-stabilized zirconia (ScSZ), calcium-stabilized zirconia (CSZ) or a mixture thereof.

According to still another embodiment, the crude particles and nanoparticles may be mixed at a molar (M) ratio of 7:3-3:7.

According to still another embodiment, the nanoparticle precursor solution may include a nanoparticle precursor, solvent, additive and a sintering aid.

According to still another embodiment, the sintering aid may be at least one selected from the group consisting of cobalt, copper, zinc, nickel, iron, manganese and lithium.

According to still another embodiment, the additive may be at least one selected from glycine, citric acid and urea, and the molar ratio between the additive and nanoparticle precursor may be 0.5-0.8:1.

According to yet another embodiment, the solvent may be distilled water.

In another aspect, there is provided an electrolyte including the sintered body obtained by the above-defined method for manufacturing a sintered body, and a solid oxide fuel cell including the electrolyte.

According to some embodiments of the present disclosure, there is provided mixed powder containing nanoparticles attached firmly to the surface of crude particles. Thus, it is possible to inhibit agglomeration of the nanoparticles and to control the sintering characteristics of a sintered body through a simple method, including controlling the proportions of the crude particles and nanoparticles. In addition, when adding a sintering aid, the sintering aid is introduced uniformly to the whole area of the powder upon the synthesis of the nanoparticles. Thus, it is possible to inhibit effectively generation of processing defects caused by a local difference in sintering rate. An electrolyte using the sintered body having controlled sintering characteristics is effective for forming a firm thin film layer. In addition, the electrolyte having such a firm thin film layer inhibits combustion of fuel with oxygen when it is applied to a fuel cell, and thus is significantly effective for improving the quality of the cell.

DETAILED DESCRIPTION OF EMBODIMENTS

Figure 1A:
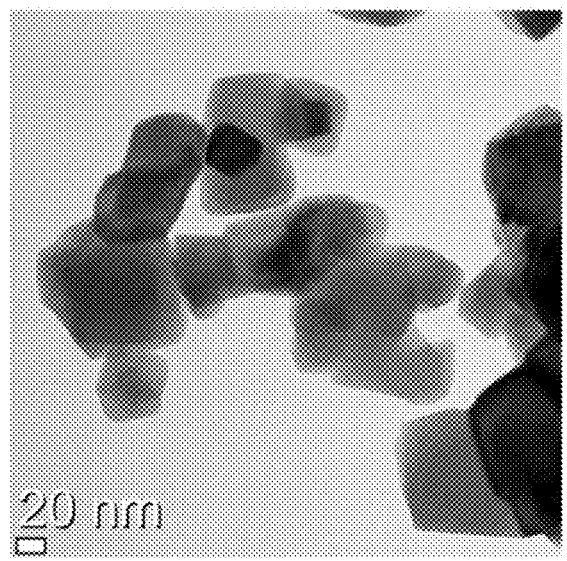
FIGS. 1A and 1B show the results of analysis for commercially available gadolinia-doped ceria (GDC) powder and the sintered body powder according to Example 1, as determined by scanning electron microscopy (SEM), wherein FIG. 1A corresponds to commercially available GDC powder and FIG. 1B corresponds to Example 1.

Hereinafter, various aspects and embodiments of the present disclosure will be explained in more detail.

In one aspect, there is provided a method for manufacturing a sintered body for an electrolyte, which includes: (i) mixing a solution containing preliminarily formed crude particles dispersed therein with a nanoparticle precursor solution for preparing nanoparticles; (ii) a combustion step wherein nanoparticles are prepared on the surface of the crude particles from the resultant mixture; and (iii) a calcination step wherein impurities are removed from the combustion product, wherein the crude particle is at least one selected from cerium oxides including at least one selected from the group consisting of gadolinium (Gd), samarium (Sm) and lanthanum (La), and zirconium oxides including at least one selected from the group consisting of yttrium (Y), scandium (Sc) and calcium (Ca); and the nanoparticles are prepared in the form of nanoparticles attached to the surface of the crude particles through a combustion process using at least one selected from cerium nitrate, gadolinium nitrate, samarium nitrate, lanthanum nitrate, zirconium nitrate, yttrium nitrate, scandium nitrate and calcium nitrate as a precursor.

In step (i), the crude particle solution is mixed with the nanoparticle precursor solution. First, the crude particles are dispersed into a solvent along with additives, such as a dispersant. In a separate container, the nanoparticle precursor is dissolved into a solvent along with additives. Then, the two compositions are mixed in a solution state.

The crude particles refer to particles formed to have a relatively large particle size, while crystals are grown or recrystallization occurs. As used herein, crude particles refer to those having a larger size than the nanoparticles.

Particularly, the crude particle may be at least one selected from cerium oxides including at least one selected from the group consisting of gadolinium (Gd), samarium (Sm) and lanthanum (La), and zirconium oxides including at least one selected from the group consisting of yttrium (Y), scandium (Sc) and calcium (Ca).

The nanoparticles are those having a size smaller than the crude particles, and may be prepared in the form of nanoparticles attached to the surface of the crude particles through a combustion process using at least one selected from cerium nitrate, gadolinium nitrate, samarium nitrate, lanthanum nitrate, zirconium nitrate, yttrium nitrate, scandium nitrate and calcium nitrate as a precursor.

Particularly, the crude particles may have a diameter of 0.1-3 μm and the nanoparticles may have a diameter of 10-80 nm. When the crude particles have a size less than 0.1 μm, it is difficult to provide an effect of controlling a high sintering rate of the nanoparticles. When the crude particles have a size larger than 3 μm, they cannot be used for an electrolyte thin film process. In addition, it is practically difficult for the nanoparticles to maintain a diameter of 10 nm or less after a sintering process. When the nanoparticles have a size larger than 80 nm, it is difficult to accelerate sintering of the nanoparticles as compared to the crude particles.

The crude particles and the nanoparticles may be mixed at a molar (M) ratio of 7:3-3:7. When the molar ratio is not within the above-defined molar ratio, the sintered body may undergo degradation of sintering characteristics.

In other words, the amount of crude particles and that of the nanoparticles increase or reduce the degree of sintering of the sintered body, and thus function to control the sintering characteristics of the sintered body.

The nanoparticle precursor solution may include a nanoparticle precursor, solvent, additives and a sintering aid, wherein the additives may be at least one selected from glycine, citric acid and urea.

The nanoparticles and the additives may be mixed at a molar (M) ratio of 0.5-0.8:1. Since the additives function as fuel for combustion, it is possible to control the sintering characteristics of the sintered body by adjusting the amount of the additives.

In other words, when the molar ratio of the nanoparticles to the additives is not within the above-defined range, the combustion temperature may be changed rapidly, thereby adversely affecting the size of the nanoparticles.

The solvent may be distilled water.

The sintering aid controls shrinking to make initial shrinking slow and later shrinking fast, and functions to decrease the final sintering temperature.

Particularly, the sintering aid may be at least one selected from cobalt, copper, zinc, nickel, iron, manganese and lithium, and more particularly cobalt.

In addition, the two solutions may be mixed after carrying out ball milling before the crude particle solution and the nanoparticle precursor solution dispersed in a solvent are mixed with each other. The purpose of ball milling is distributing particles uniformly into the solution.

According to the related art, a sintering aid in the form of an oxide or nitrate is added to and mixed with preliminarily formed powder. However, such a method cannot disperse the sintering aid uniformly, resulting in non-uniformity. This causes a defect in that a region having a relatively higher concentration of sintering aid shrinks faster and thus a difference in sintering rate occurs upon sintering.

Therefore, to solve the above-mentioned problem, according to the present disclosure, distribution uniformity of the sintering aid is ensured by dissolving a sintering aid precursor into the nanoparticle precursor solution and allowing the sintering aid to be introduced simultaneously with the synthesis of nanoparticles during combustion. This functions to improve a degree of sintering effectively.

In step (ii), the mixture obtained from step (i) is subjected to combustion to obtain sintered body powder having a crystal structure.

Herein, the reaction temperature may be maintained at 100-500° C. to perform solvent evaporation, gelation and spontaneous combustion successively. When the reaction temperature is lower than 100° C., combustion does not occur. When the reaction temperature is higher than 500° C., it is difficult to control the process.

In step (iii), the combustion product obtained from step (ii) is subjected to post-treatment so that it may be further sintered to remove residue.

Herein, the post-treatment may be carried out at a reaction temperature of 400-1000° C. for 1-10 hours. When the reaction temperature is lower than 400° C., a part of carbon compounds may not be removed. When the reaction temperature is higher than 1000° C., excessive particle growth may occur in the nanoparticles and the nanoparticles may lose their unique characteristics.

Then, after step (iii), ball milling and drying may be carried out to finish the process.

In another aspect, there is provided an electrolyte including the sintered body obtained by the above-defined method for manufacturing a sintered body, and a solid oxide fuel cell including the electrolyte.

The examples and experiments will now be described. The following examples and experiments are for illustrative purposes only and not intended to limit the scope of this disclosure. In addition, it will be apparent to those skilled in the art that various changes and modifications may be made based on the disclosure of the present disclosure including the following examples.

In addition, the test results described hereinafter merely include representative test results of the examples and comparative examples. The effect of each of different embodiments that are not suggested particularly hereinafter will be described in detail at the corresponding part.

Examples 1-5: Manufacture of Sintered Body to which No Sintering Aid is Added (i) Preparation of Crude Particle Solution (a) and Nanoparticle Precursor Solution (b)

Gadolinia-doped (GDC) (LSA, Rohdia) and a dispersant (KD-6, Hypermer) are introduced to distilled water and ball milling is carried out by using zirconia balls (5φ) for 24 hours to obtain a crude particle solution (a).

Cerium (III) nitrate hexahydrate (Kanto Chemical) and gadolinium (III) nitrate hexahydrate (Aldrich) are introduced to distilled water, followed by agitation. Then, glycerin is added thereto and agitation is carried out for at least 12 hours to obtain a nanoparticle precursor solution (b).

Then, the crude particle solution (a) and nanoparticle precursor solution (b) are introduced to a reactor and agitation is carried out for 1 hour (particular amount of each ingredient is shown in the following Table 1).

TABLE 1

| | | *(Crude particle:Nanoparticle) | | | |
|---|---|---|---|---|---|
| | Ex. 1 *(7:3) | Ex. 2 *(6:4) | Ex. 3 *(5:5) | Ex. 4 *(4:6) | Ex. 5 *(5:5) |
| (a) GDC | 14 g | 12 g | 10 g | 8 g | 10 g |
| Distilled water | 100 mL | 100 mL | 100 mL | 100 mL | 100 mL |
| Dispersant | 0.42 g | 0.36 g | 0.3 g | 0.24 g | 0.3 g |
| (b) cerium nitrate hexahydrate | 13.625 g | 18.167 g | 22.709 g | 27.250 g | 22.709 g |
| gadolinium nitrate hexahydrate | 1.575 g | 2.100 g | 2.625 g | 3.150 g | 2.625 g |
| Glycine | 4.318 g | 5.757 g | 7.196 g | 8.636 g | 10.467 g |
| Dispersant | 60 mL | 60 mL | 60 mL | 60 mL | 60 mL |
| Molar ratio of glycine:nitrate | 0.55:1 | 0.55:1 | 0.55:1 | 0.55:1 | 0.8:1 |

*Note: (Crude particle:Nanoparticle) refers to a molar ratio (ii) Combustion

A tempered glass container is heated on a hot plate to a temperature of 250° C., the solution of (i) is poured thereto and the container is covered with a net having a mesh size of about 100 μm. Then, combustion is completed as distilled water is evaporated completely to obtain powder.

(iii) Post-Treatment

The powder obtained from (ii) is filtered with a sieve having a size of 150 mesh and sintered at a temperature of 600° C. for 2 hours to remove residue. Then, dry ball milling is carried out by using zirconia balls (5ϕ) for 24 hours to obtain sintered body powder.

Example 6: Manufacture of Sintered Body to which Sintering Aid is Added (i) Preparation of Crude Particle Solution (a) and Nanoparticle Precursor Solution (b)

Example 3 is repeated, except that 0.504 g of cobalt nitrate is further added and glycerin is introduced in an amount of 7.768 g to obtain a nanoparticle precursor solution (b).

(ii) Combustion

Combustion is carried out in the same manner as Example 3.

(iii) Post-Treatment

Post-treatment is carried out in the same manner as Example 3.

Test Example 1: SEM and TEM Analysis

Commercially available gadolinia-doped ceria (GDC) powder and the sintered body powder of Example 1 are analyzed by scanning electron microscopy (SEM) and transmission electron microscopy (TEM), and the results are shown in FIG. 1-FIG. 4.

Figure 1B:
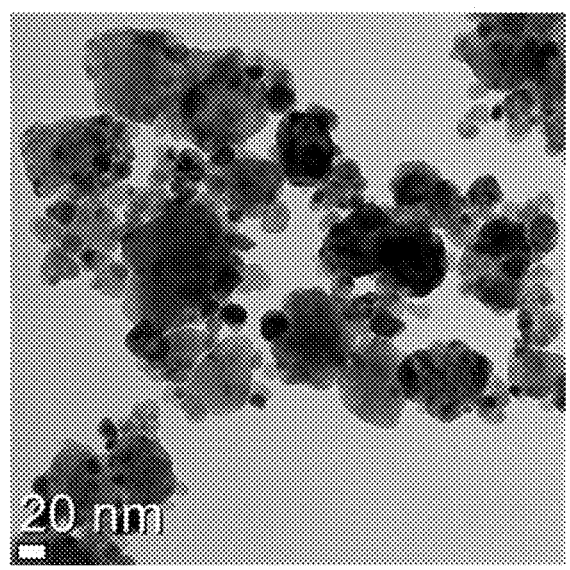

First, FIG. 1 shows the results of analysis for commercially available gadolinia-doped ceria (GDC) powder and the sintered body powder according to Example 1, as determined by scanning electron microscopy (SEM), wherein (a) corresponds to commercially available GDC powder and (b) corresponds to Example 1.

Referring to FIG. 1, in the case of Example 1, it can be seen that nano-scaled micropowder is attached uniformly to the surface of crude powder and substantially no agglomeration of micropowder occurs.

Figure 2:
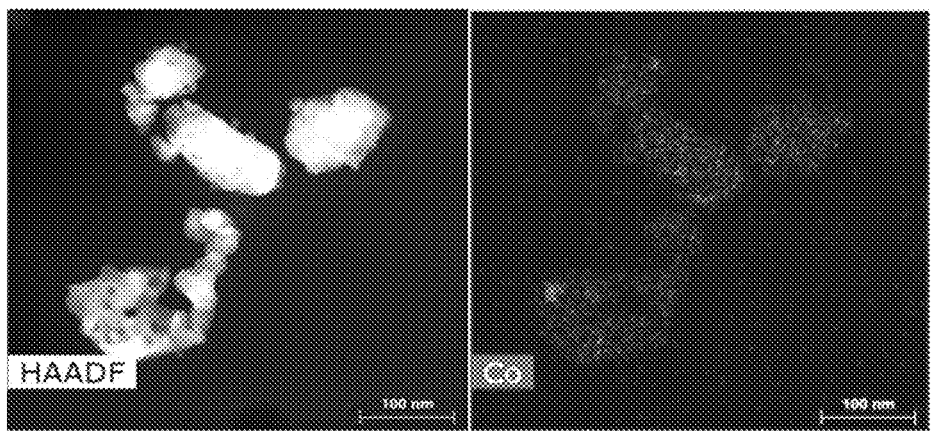
FIG. 2 is an image illustrating the results of analysis for the ingredients of the sintered body powder according to Example 6.
Figure 3:
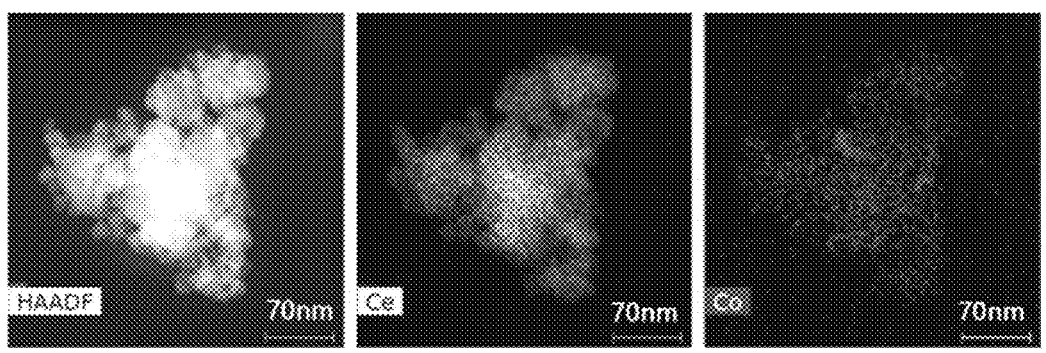
FIG. 3 is an image illustrating the results of analysis for the sintered body powder according to Example 6, as determined by transmission electron microscopy (TEM).

FIG. 2 is an image illustrating the results of analysis for the ingredients of the sintered body powder according to Example 6. FIG. 3 is an image illustrating the results of analysis for the sintered body powder according to Example 6, as determined by transmission electron microscopy (TEM).

Figure 4:
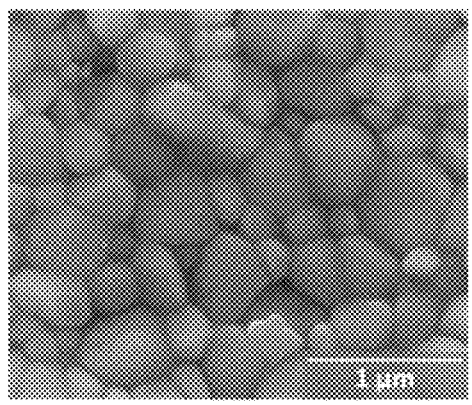
FIG. 4 is an image illustrating the results of analysis for the sintered body powder according to Example 6 after it is sintered at a temperature of 1100° C., as determined by scanning electron microscopy.
Figure 5A:
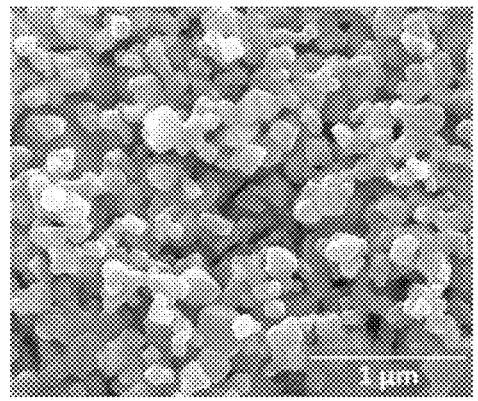
FIGS. 5A to 5D show the results of scanning electron microscopy for commercially available GDC powder and the sintered body powder according to Example 3, after they are sintered at 1150° C. and 1250° C., wherein FIG. 5A and FIG. 5B correspond to commercially available GDC powder sintered at 1150° C. and 1250° C., respectively, and FIG. 5C and FIG. 5D correspond to Example 3 sintered at 1150° C. and 1250° C., respectively.
Figure 5B:
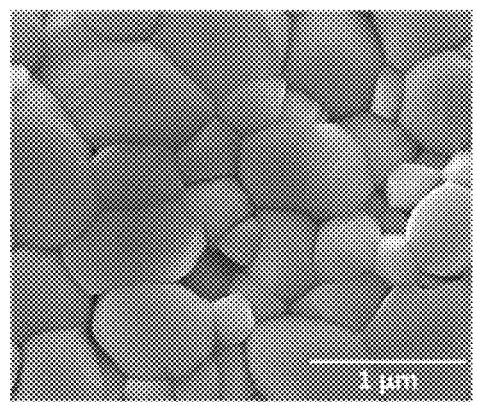
Figure 5C:
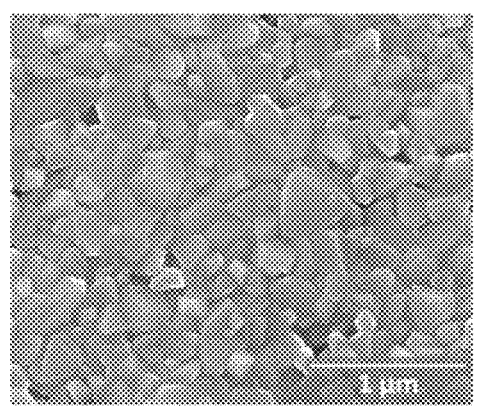
Figure 5D:
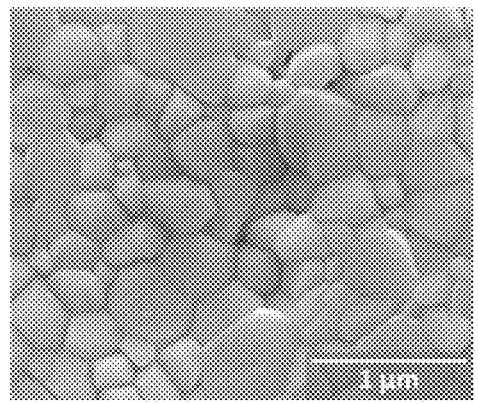

FIG. 4 is an image illustrating the results of analysis for the sintered body powder according to Example 6 after it is sintered at a temperature of 1100° C., as determined by scanning electron microscopy. It can be seen that sintering of the sintered body provides a substantially completely dense and compact structure, and the nanoparticles are attached uniformly to the surface of the crude particles so that cobalt as a sintering aid is also distributed very uniformly without agglomeration.

The above results suggest that addition of a sintering aid fundamentally solves the problem caused by a local difference in sintering aid according to the related art.

In addition, FIG. 5 shows the results of scanning electron microscopy for commercially available GDC powder and the sintered body powder according to Example 3, after they are sintered at 1150° C. and 1250° C., wherein (a) and (b) correspond to commercially available GDC powder sintered at 1150° C. and 1250° C., respectively, and (c) and (d) correspond to Example 3 sintered at 1150° C. and 1250° C., respectively.

Referring to FIG. 5, in the case of (a), little densification occurs and thus a significantly large number of pores is present. In the case of (b) using an increased sintering temperature, it can be seen that densification occurs slightly but the grain size is large due to severe particle growth. Therefore, since an increase in grain size of a film causes degradation of mechanical stability, it is required to carry out densification to an adequate degree while grain growth is inhibited. On the contrary, (c) and (d) corresponding to Example 3 form a dense structure and maintain a very fine grain structure. Further, in the case of (d) using an increased sintering temperature, it forms a more dense structure and maintains a significantly smaller grain size.

Test Example 2: XRD Analysis

Figure 6:
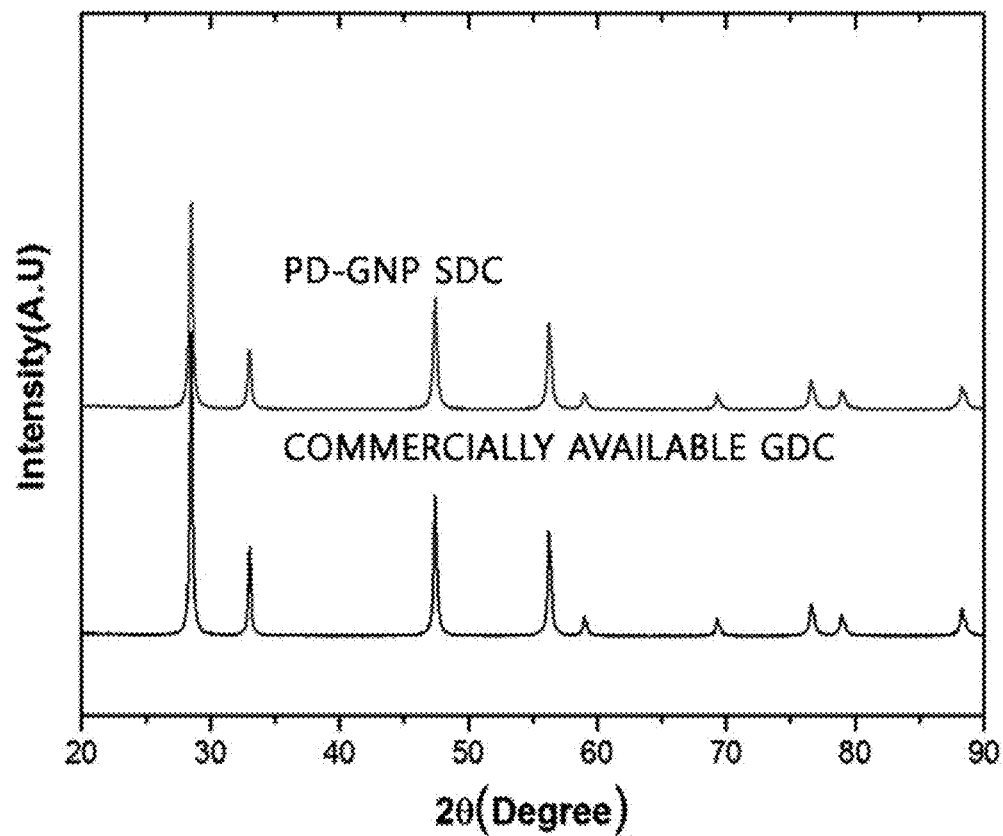
FIG. 6 is a graph illustrating the results of X-ray diffraction analysis (XRD) for commercially available GDC powder and Example 1.

Commercially available GDC powder and the sintered body powder of Example 1 are analyzed by X-ray diffractometry (XRD) and the results are shown in FIG. 6.

Referring to FIG. 6, commercially available GDC powder and the sintered body powder of Example 1 form a phase having the same cubic fluorite structure, which suggests that the sintered body according to an embodiment of the present disclosure shows no difference in crystal structure as compared to the commercially available powder.

Test Example 3: Analysis of Sintering Characteristics

Figure 7:
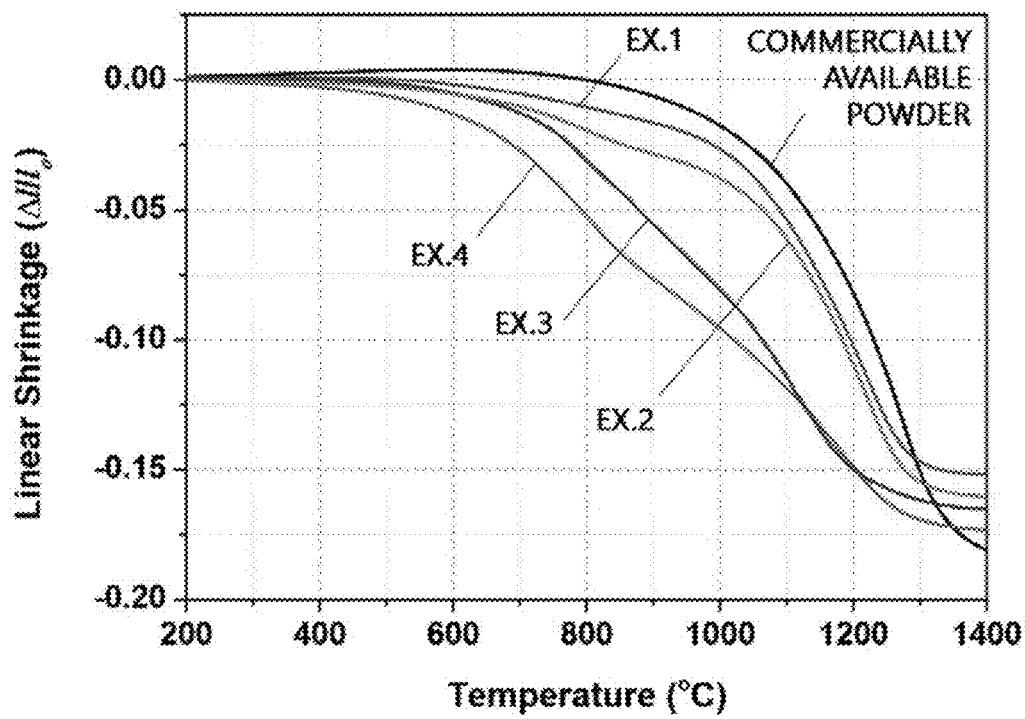
FIG. 7 is a graph illustrating a degree of sintering for commercially available GDC powder and electrolyte powder according to Examples 1-4.
Figure 8:
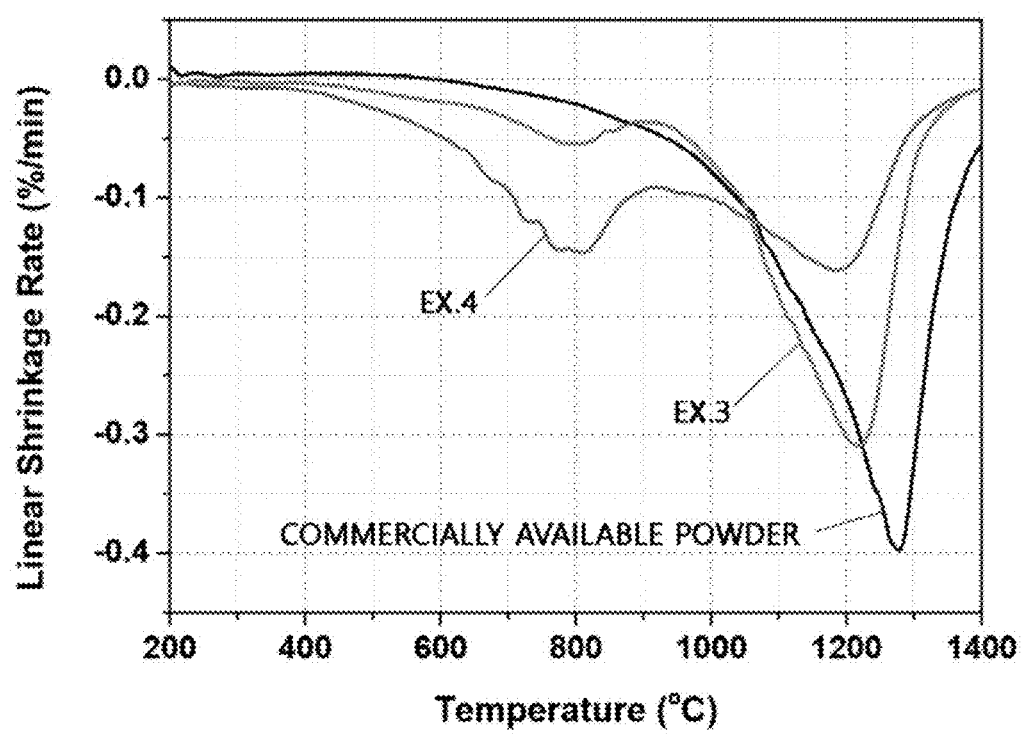
FIG. 8 is a graph illustrating a sintering rate of commercially available GDC powder and electrolyte powder according to Examples 3 and 4 as a function of temperature.

Commercially available GDC powder and the sintered body according to each of Examples 1-4 are analyzed for sintering characteristics depending on temperature, and the results are shown in FIG. 7 and FIG. 8.

In general, the sintering characteristics of a sintered body can be determined by measuring a linear shrinkage depending on a change in temperature.

Referring to FIG. 7, it can be seen that the sintered body powder according to each of Examples 1-4 shows excellent sintering characteristics as compared to commercially available powder, and a degree of sintering gradually increases as the amount of nanoparticles increases.

In addition, FIG. 8 shows a sintering rate as a function of temperature. While commercially available powder shows the peak of shrinking rate at a single temperature, Examples 3 and 4 shows the peaks of shrinking rate in two steps. This is because sintering of nanoparticles occurs first at low temperature and then sintering of crude particles occurs after the temperature reaches a specific temperature. It can be seen that low-temperature sintering is carried out more as the amount of nanoparticles increases.

In other words, it can be seen based on the above results that when the initial and later sintering behaviors are controlled independently, it is possible to realize a precise sintering behavior required for actual applications.

Test Example 4: Analysis of Sintering Characteristics Depending on Change in Glycine Content and Use of Sintering Aid A change in degree of sintering is determined by increasing the molar ratio of glycine to cation nitrate in Examples 3 and 5, and the results are shown in FIG. 9.

Figure 9:
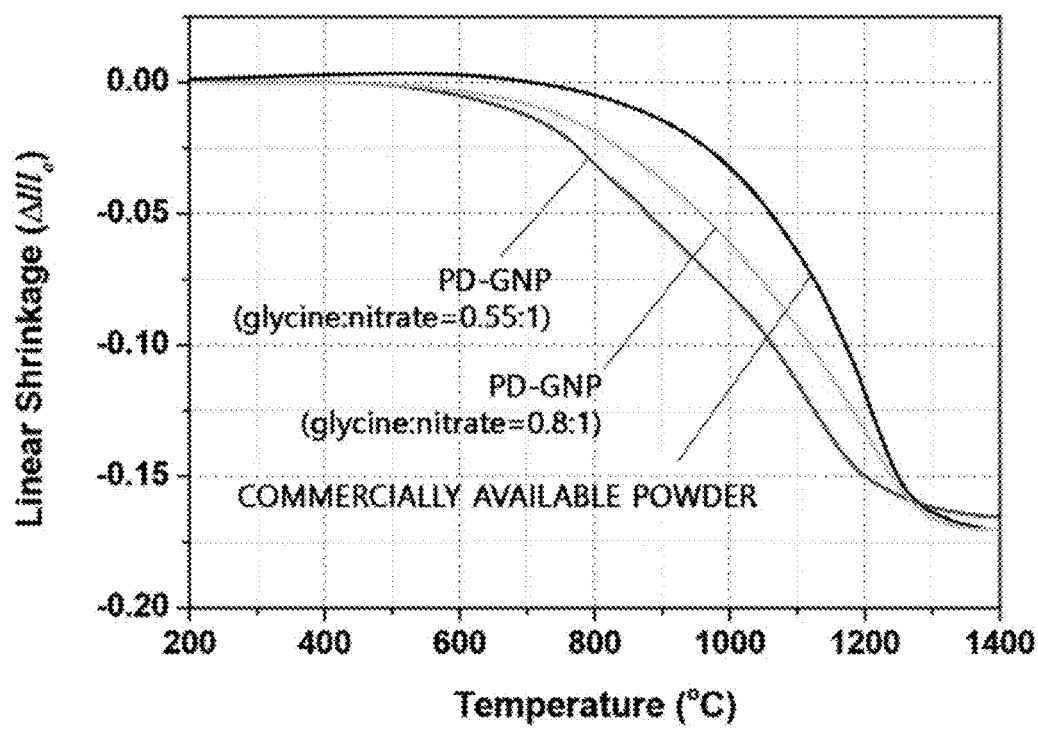
FIG. 9 is a graph illustrating the results of linear shrinkage varied with an increase in the molar ratio of glycine and cation nitrate from 0.55 to 0.8 in Examples 3 and 5.

Referring to FIG. 9, glycine functions as fuel for combustion, and thus combustion temperature varies with the amount of glycine, thereby affecting the size of nanoparticles. In other words, it is possible to control sintering characteristics not only by controlling the amount of nanoparticles and that of crude particles but also by controlling the amount of glycine.

Figure 10:
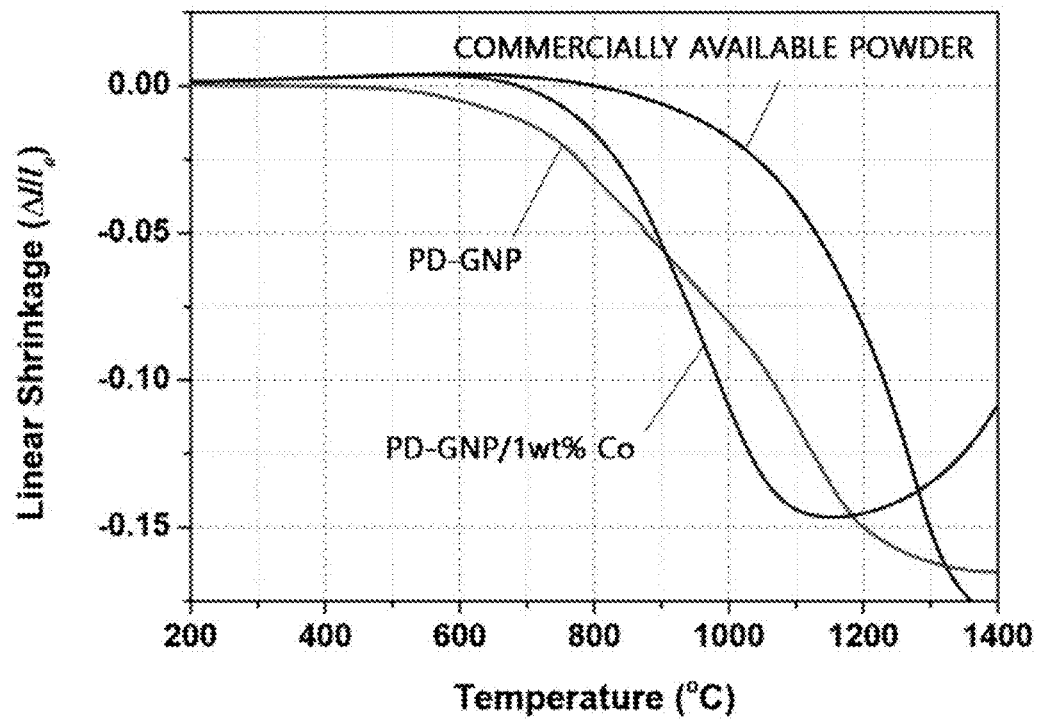
FIG. 10 is a graph illustrating the results of linear shrinkage for Examples 3 and 6.

In addition, FIG. 10 is a graph illustrating the results of linear shrinkage for Examples 3 and 6. In the case of Example 6 to which a sintering aid is added, an effect of rapid shrinking caused by nanoparticles at the initial time of sintering is degraded but such a shrinking effect is increased at a later time. Thus, it can be seen that sintering is completed at a lower temperature.

In other words, a small amount of sintering aid may be added to control the shrinking in such a manner that the initial shrinking becomes slow and the later shrinking becomes fast. Further, addition of a sintering aid may reduce the final sintering temperature.

Therefore, according to some embodiments of the present disclosure, it is possible to control the sintering characteristics of a sintered body through a simple method, such as controlling the amounts of crude particles and nanoparticles. In addition, an electrode using the obtained sintered body having controlled sintering characteristics is effective for forming a firm thin film layer.

Further, such an electrolyte having a firm thin film layer formed thereon inhibits combustion of fuel with oxygen when it is applied to a fuel cell, and thus shows significantly effective for improving the quality of a cell.

What is claimed is:

1. A method for manufacturing a sintered body for an electrolyte, which comprises:
   (i) mixing a solution containing preliminarily formed crude particles dispersed therein with a nanoparticle precursor solution for preparing nanoparticles;
   (ii) a combustion step wherein nanoparticles are prepared on the surface of the crude particles from the resultant mixture; and
   (iii) a calcination step wherein impurities are removed from the combustion product,
   wherein the crude particle is at least one selected from cerium oxides and zirconium oxides, the cerium oxides including at least one selected from the group consisting of gadolinium (Gd), samarium (Sm) and lanthanum (La), and the zirconium oxides including at least one selected from the group consisting of yttrium (Y), scandium (Sc) and calcium (Ca); and
   the nanoparticles are prepared in the form of nanoparticles attached to the surface of the crude particles through a combustion process using at least one selected from cerium nitrate, gadolinium nitrate, samarium nitrate, lanthanum nitrate, zirconium nitrate, yttrium nitrate, scandium nitrate and calcium nitrate as a precursor.

2. The method for manufacturing a sintered body for an electrolyte according to claim 1, wherein the crude particles have a diameter of 0.1-3 μm, and the nanoparticles have a diameter of 10-100 nm.

3. The method for manufacturing a sintered body for an electrolyte according to claim 1, wherein the crude particles and nanoparticles are mixed at a molar (M) ratio of 7:3-3:7.

4. The method for manufacturing a sintered body for an electrolyte according to claim 1, wherein cerium oxide is gadolinia-doped ceria (GDC), samaria-doped ceria (SDC), lanthanum-doped ceria (LDC) or a mixture thereof.

5. The method for manufacturing a sintered body for an electrolyte according to claim 1, wherein zirconium oxide is yttria-stabilized zirconia (YSZ), scandia-stabilized zirconia (ScSZ), calcium-stabilized zirconia (CSZ) or a mixture thereof.

6. The method for manufacturing a sintered body for an electrolyte according to claim 1, wherein the nanoparticle precursor solution comprises a nanoparticle precursor, solvent, additive and a sintering aid.

7. The method for manufacturing a sintered body for an electrolyte according to claim 6, wherein the additive is at least one selected from glycine, citric acid and urea.

8. The method for manufacturing a sintered body for an electrolyte according to claim 6, wherein the nanoparticle precursor and additive are added at a molar (M) ratio of 0.5-0.8:1.

9. The method for manufacturing a sintered body for an electrolyte according to claim 6, wherein the sintering aid is at least one selected from the group consisting of cobalt, copper, zinc, nickel, iron, manganese and lithium.

10. The method for manufacturing a sintered body for an electrolyte according to claim 6, wherein the solvent is distilled water.

11. The method for manufacturing a sintered body for an electrolyte according to claim 1, wherein step (ii) is carried out at a temperature of 100-500° C.

12. The method for manufacturing a sintered body for an electrolyte according to claim 1, wherein step (iii) is carried out by performing calcination at a temperature of 400-1000° C., and then performing a ball milling process.

* * * * *